(12) United States Patent
McGinley et al.

(10) Patent No.: US 7,910,833 B2
(45) Date of Patent: Mar. 22, 2011

(54) ENERGY-SAVING POWER ADAPTER/CHARGER

(75) Inventors: Valerie L McGinley, Barrington, IL (US); Donald Rimdzius, Addison, IL (US); James McGinley, Barrington, IL (US)

(73) Assignee: Voltstar Technologies, Inc., Schaumburg, IL (US)

( * ) Notice: Subject to any disclaimer, the term of this patent is extended or adjusted under 35 U.S.C. 154(b) by 307 days.

(21) Appl. No.: 12/127,592

(22) Filed: May 27, 2008

(65) Prior Publication Data

US 2009/0295327 A1    Dec. 3, 2009

(51) Int. Cl.
*H01B 7/00*    (2006.01)
(52) U.S. Cl. .......................................... 174/112; 174/36
(58) Field of Classification Search ................. 174/74 R, 174/78, 84 R
See application file for complete search history.

(56) References Cited

U.S. PATENT DOCUMENTS

| | | | |
|---|---|---|---|
| 2,484,092 A * | 10/1949 | Hopgood ...................... | 307/114 |
| 2,706,225 A * | 4/1955 | Hopgood ................... | 200/51.02 |
| 2,759,159 A | 8/1956 | Teetor | |
| 2,907,855 A | 10/1959 | Hedges | |
| 2,979,624 A | 4/1961 | Wilby | |
| 3,524,029 A | 8/1970 | Laff | |
| 3,974,347 A * | 8/1976 | Lockard ...................... | 200/6 R |
| 4,323,762 A | 4/1982 | Ervin et al. | |
| 4,463,228 A * | 7/1984 | Osika ........................ | 200/51 R |
| 4,645,942 A | 2/1987 | Nilssen | |
| 4,647,735 A | 3/1987 | Sicher | |
| 5,070,219 A | 12/1991 | Grosskueger et al. | |
| 5,081,627 A * | 1/1992 | Yu .................................... | 714/46 |
| 5,181,902 A | 1/1993 | Erickson et al. | |
| 5,193,665 A | 3/1993 | Jankow | |
| 5,220,152 A | 6/1993 | Doran | |
| 5,321,313 A | 6/1994 | Oberhauser | |
| 5,329,083 A | 7/1994 | Lai | |
| 5,338,218 A | 8/1994 | Haas | |
| 5,359,540 A | 10/1994 | Ortiz | |
| 5,408,059 A | 4/1995 | Goble | |
| 5,494,449 A | 2/1996 | Chioo | |
| 5,594,672 A | 1/1997 | Hicks | |
| 5,721,934 A | 2/1998 | Scheurich | |
| 5,734,206 A | 3/1998 | Keizer et al. | |
| 5,911,586 A | 6/1999 | Wintergerst | |
| 6,035,408 A | 3/2000 | Huang | |
| 6,134,612 A | 10/2000 | Bailey et al. | |

(Continued)

FOREIGN PATENT DOCUMENTS

JP    2000-102184 A    4/2000

(Continued)

OTHER PUBLICATIONS

Connor, Margery, "Tightened Power-Efficiency Regulations Force Power Supplies to Keep Up," EDN, Feb. 21, 2008, www.edn.com Internet publication (3 pages).

(Continued)

*Primary Examiner* — William H Mayo, III
(74) *Attorney, Agent, or Firm* — Greenberg Traurig, LLP

(57) ABSTRACT

An embodiment of the present invention is directed to a power device for an electronic device, such as a charger for a portable rechargeable device and/or an AC adapter. The power device includes switching circuitry for de-powering at least a portion of the power device when the electronic device is either not drawing power or is disconnected from the power device.

58 Claims, 8 Drawing Sheets

U.S. PATENT DOCUMENTS

| | | | |
|---|---|---|---|
| 6,255,800 | B1 | 7/2001 | Bork |
| 6,272,030 | B1 | 8/2001 | Oomura |
| 6,461,176 | B1 | 10/2002 | Haas |
| 6,532,328 | B1* | 3/2003 | Kline ............................. 385/101 |
| 6,633,932 | B1 | 10/2003 | Bork et al. |
| 6,754,092 | B2 | 6/2004 | McDowell et al. |
| 6,774,603 | B2 | 8/2004 | Liao |
| 6,777,828 | B1 | 8/2004 | Rothstein |
| 6,790,093 | B2 | 9/2004 | Tanaka et al. |
| 6,825,427 | B2* | 11/2004 | Jenks ......................... 200/51.12 |
| 6,865,094 | B2 | 3/2005 | Malik et al. |
| 6,874,093 | B2 | 3/2005 | Bell |
| 6,895,516 | B2 | 5/2005 | Odaohhara |
| 7,049,937 | B1* | 5/2006 | Zweig et al. .............. 340/310.11 |
| 7,101,226 | B1* | 9/2006 | Gillilliand |
| 7,106,302 | B2 | 9/2006 | Chen et al. |
| 7,132,763 | B2 | 11/2006 | Rendic |
| 7,183,743 | B2 | 2/2007 | Geiger |
| 7,184,258 | B2 | 2/2007 | Lai |
| D543,147 | S | 5/2007 | Ng |
| 7,221,284 | B2* | 5/2007 | Scherer et al. ........... 340/815.45 |
| 7,224,086 | B2 | 5/2007 | Germagian et al. |
| 7,516,343 | B2 | 4/2009 | Bhogal et al. |
| 7,544,909 | B2* | 6/2009 | Dhir ............................ 200/51.12 |
| 7,597,570 | B2 | 10/2009 | So |
| 7,635,273 | B2 | 12/2009 | Buzil et al. |
| 2006/0152867 | A1 | 7/2006 | Bonasia et al. |
| 2006/0194467 | A1 | 8/2006 | Beasley et al. |
| 2006/0278794 | A1 | 12/2006 | Rast |
| 2006/0292905 | A1* | 12/2006 | Gillilliand |
| 2007/0141894 | A1* | 6/2007 | McGinley et al. |
| 2007/0164704 | A1* | 7/2007 | McGinley et al. |
| 2008/0054845 | A1 | 3/2008 | Wang |
| 2008/0170060 | A1 | 7/2008 | Chen |
| 2009/0295226 | A1 | 12/2009 | Hodges |
| 2010/0041262 | A1 | 2/2010 | Chesneau |

FOREIGN PATENT DOCUMENTS

| | | |
|---|---|---|
| JP | 2002-151221 | 5/2002 |
| JP | 2002-469544 A | 5/2002 |

OTHER PUBLICATIONS

Wallman, Dana, "Green Energy, A new charging solution conserves electricity by cutting off power to fully charged gadgets," Laptop Magazine, May 2008 (1 pages).

ECNMag.com, "Brainstorm—Portable Power, Nov. 1, 2007," ECNMag, Nov. 1, 2007, www.ecnmag.com internet publication (2 pages).

Lombardi, Candace, "Your cell phone is charged—please unplug," CNET News.com, Sep. 21, 2006, www. news.com internet publication (3 pages).

Bombippy.com, "Is phantom load really a wall wart?," Nov. 15, 2007, www.bombippy.com internet publication (3 pages).

Author unknown, "Phantom Load Killers," May 20, 2006, cbll.net internet publication (2 pages).

Alt, Marc, "The gadget guru," "clever strip," Mar. 2008, Domino Magazine, p. 48 (1 page).

Houghton, Stuart, "Nokia unveils eco-charger," Apr. 29, 2008, www.pocketpicks.com internet publication (5 pages).

NokNok.tv, "Zero waste Nokia charger concept unveiled," Apr. 29, 2008, noknok.tv internet publication (4 pages).

Yinli Electronic Industry Co. Ltd, "AC/DC Adapter," yinli.manufacturer.globalsources.com internet publication (2 pages).

Zhejiang Lianlong Electron & Electric Appliances Co., Ltd, "500 mA Plug-in AC/DC Adapter," lianlong.manufacturer. globalsources.com internet publication (2 pages).

TLC Direct, "13 Amp RCD Adaptor," www.tlc-direct.co.uk internet publication (2 pages).

Duronic, "3v 4.5v 6v 7.5v 9v 12v DC Regulated Power Supply 1200 mA," Amazon.com.uk internet publication (2 pages).

Hama, "Universal 2.5A Stabilised Power Supply," Amazon.com.uk internet publication (3 pages).

Greenplug, www.greenplug.com internet publication (4 pages).

VREJ Barkhordarian, Power MOSFET Basics, International Rectifier, 13 pages, El Segundo, California.

NokNok.tv, NokNok—Tap into your Nokia's hidden talents, 4 pages, http://noknok.tv/news/zero-waste-nokia-charger-concept-unveiled.

Green Plug, One Plug—One Planet, 2 pages, http://www.greenplug.us/oneplug.html.

amazon.co.uk, 3v 4.5v 6v 7.5v 9v 12 v DC Regulated Power Supply 1200 mA, 2 pages, http://www.amazon.co. uk/4-5v-Regulated-Power-Supply.

de-direct.co.uk, 13 Amp RCD Adaptor part of RCD Plug-in Adaptors, 2 pages, BRJ03.

de-direct.co.uk, 13 Amp RCD Adaptor part of RCD Plug-in-Adaptors, 2 pages, TLARCD.

www.youtube.com, Exclusive Nokia Zero Waste charger concept, 1 page, http://www.youtube.com/watch? v=JIXEv0jWR-8.

* cited by examiner

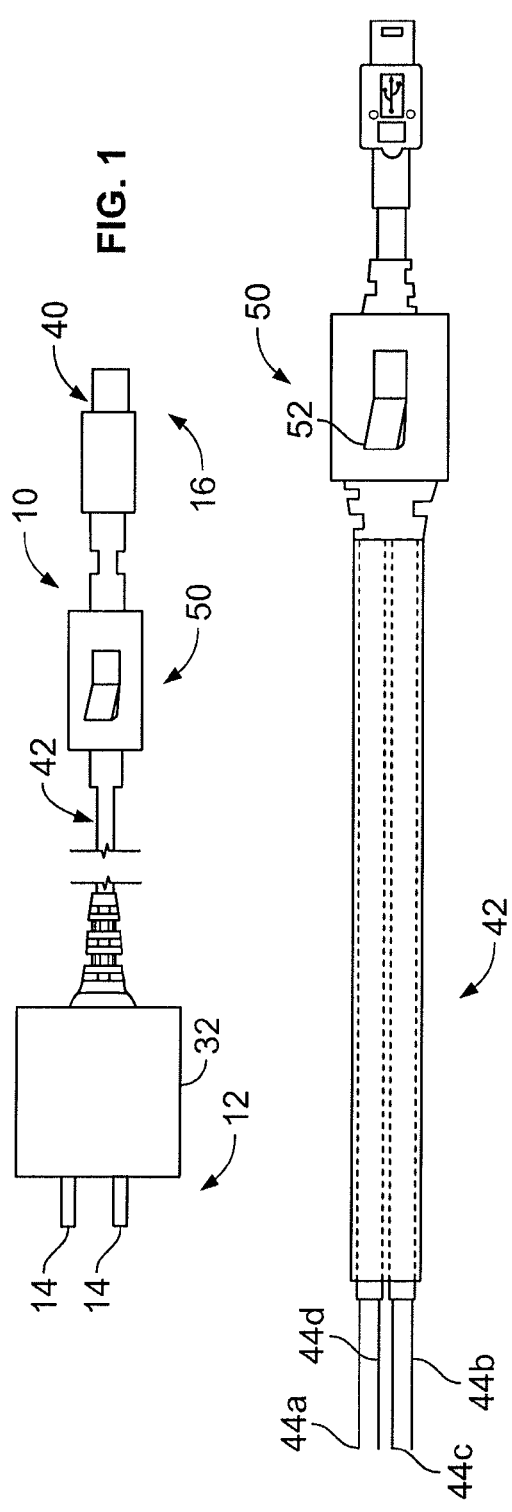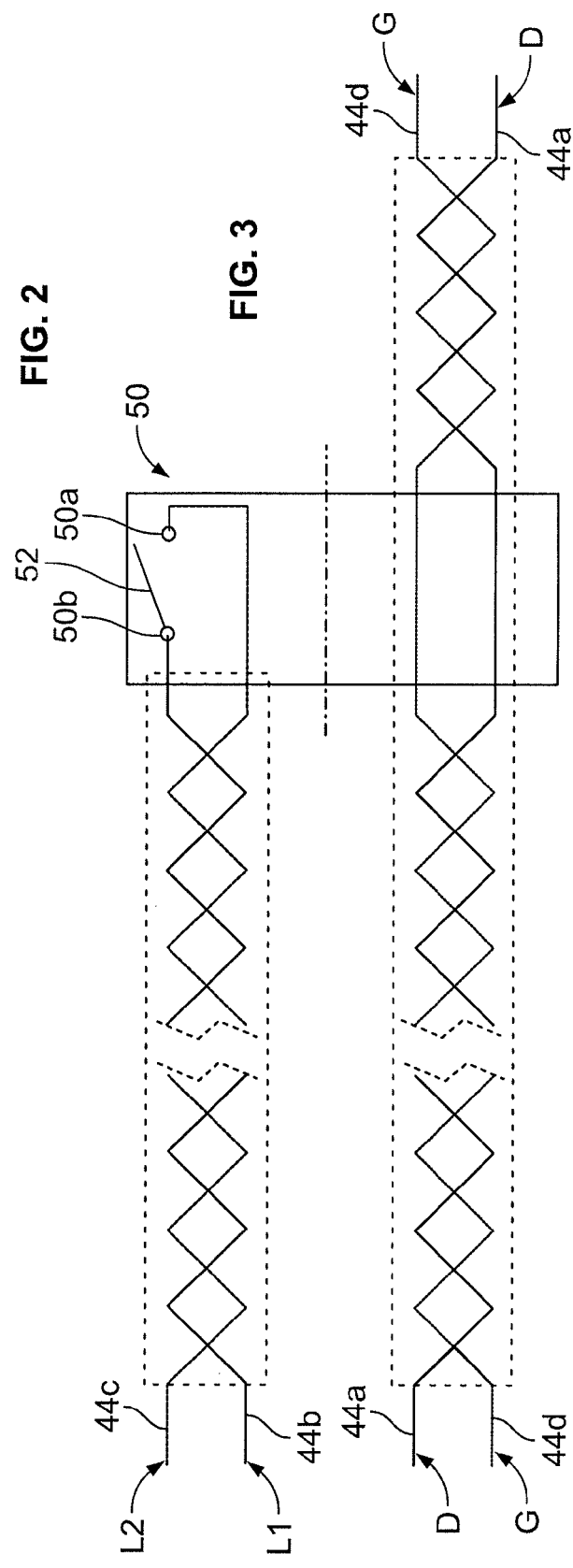

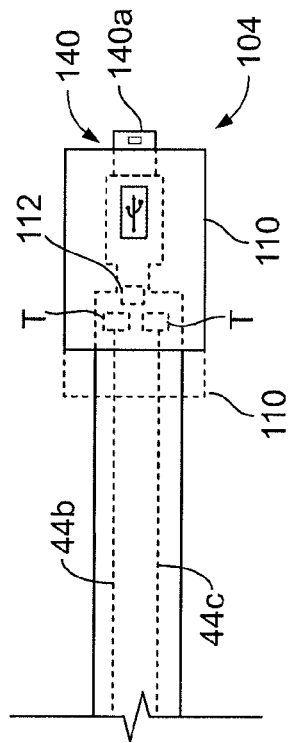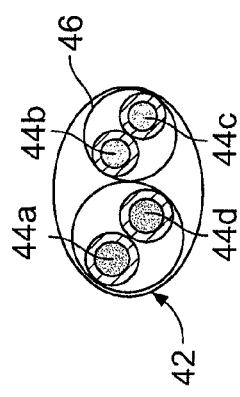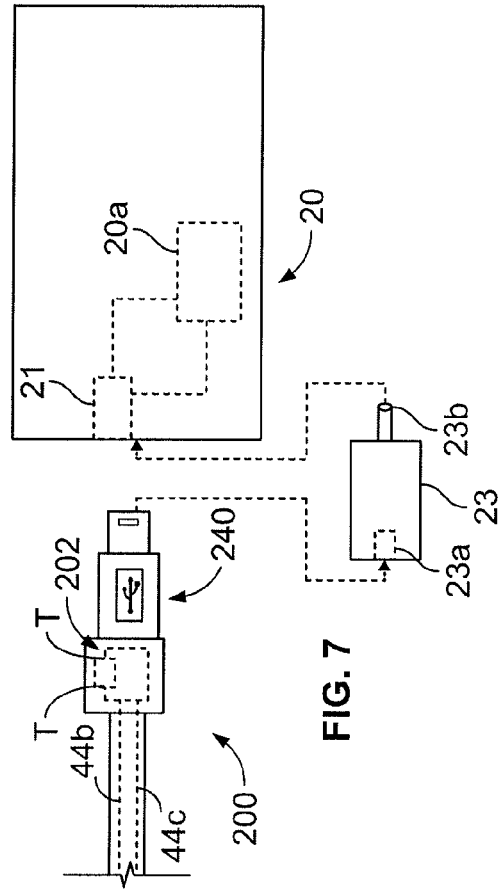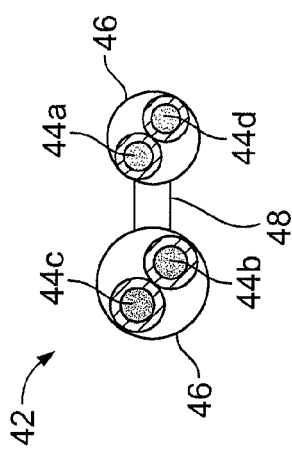

ENERGY-SAVING POWER ADAPTER/CHARGER

FIELD OF THE INVENTION

The invention relates to power devices and, in particular, to power devices having an automatic shut-off feature to reduce or eliminate useless power draw from an outlet and, more particularly, to automatic shut-off power adapters and/or chargers removably connectable to electronic devices for powering by the adapters/chargers.

BACKGROUND

Many portable electronic devices exist today for consumers. In fact, many consumers carry multiple portable devices such as music players, cellular telephones, personal data assistants, smartphones such as those marketed as a Blackberry by Research In Motion, Inc., portable global positioning system devices, etc. These portable devices are powered by a rechargeable, on-board battery.

In order to charge the battery, the portable device (or possibly just the battery thereof) is connected to a power device. Typically, the power device is a combination of a charger and a power adapter so that alternating current with an input voltage is received and converted to direct current, and the voltage is stepped-down to an output voltage for which the battery is designed. It should be noted that, depending on source power and output power requirements, the power device need not always convert and step, instead being able to do one or the other, such as may be the case for a DC-DC adapter used only to step-down the input voltage to an output voltage or simply receiving input power and delivering output power to the battery.

The power device typically has a first end with a pair of prongs that are received in and connected to a receptacle of a power outlet, and has a cable extending from the first end to a second end, the second end having a connector for electrical connection with the portable device. The power device also typically includes internal circuitry for the power conversion and stepping, and this circuitry requires an enlarged portion (enlarged relative to the cable of the power device). The enlarged portion is typically located at or adjacent the first end, though it may be inline and between the first and second ends or be located at the second end such as in a desktop-style or cradle-type charger.

Regardless of the configuration, the usage of the power device is almost uniformly identical. Specifically, a user connects the first, prong-bearing end of the power device with a receptacle, such as a receptacle of a wall-oriented/mounted power outlet. The power device second end is placed in a convenient place for the user to reach, and the portable device is connected to the second end when recharging is needed or desired, commonly on a daily basis at the end of a day. When the user desires to use or carry it, the portable device is disconnected from the power device, and the second end is left in the convenient place. Rarely, if ever, does the user think to unplug the power device from the receptacle. One of the reasons for this is that receptacles are typically behind furniture or in another location that is difficult to reach, or it is just too much trouble to unplug when it is known that it will need to be plugged in again a relatively short period of time.

There is a growing but still largely unappreciated recognition by users that leaving the power device plugged in allows the power device to continue to draw current or power from the receptacle despite no portable device being connected therewith. This power draw is referred to as phantom load. To be more precise, phantom load is residual power consumption by power devices when not connected to their host electronic device, or when the electronic device is shut off.

Phantom load is becoming a greater issue for the public. Electrical devices that result in the described phantom load are continually increasing in per capita usage, populations increase exponentially, and great portions of the world's population are gaining the discretionary capital that enables the purchase of such devices. Energy is becoming more expensive on a monetary basis, and energy production overwhelmingly has an environmental impact, such as fossil fuel or nuclear energy.

Extensive effort has been and continues to be put into development of energy-efficient devices of all sorts. The "Energy Star" program sponsored by the United States Environmental Protection Agency and the United States Department of Energy is well known, though principally for energy efficiency appliances and building products such as glass doors and windows. In parallel with Energy Star standards efforts, a variety of state and federal laws have been enacted that are directed toward external power-supply products, which includes power devices or chargers for portable electronic devices. The most-recent standard for such portable devices is version 2.0 and is considered a push beyond simply forcing the industry to use power efficient components and layouts, requiring more complex power devices and supplies.

A recent development that arose during the preparation of the present application is a prototype device from Nokia that operates with a mechanical switch. Specifically, the Nokia device has a first end receivable in a power receptacle and including a housing for internal circuitry that provides the charger/adapter functions. The Nokia device is turned on by depressing a button on the housing; when the internal circuitry recognizes the electronic device is fully charged, the button is released and the Nokia device is turned off.

While it is believed to have been developed after conception of the invention of present application, the Nokia device highlights some interesting points about efforts in this arena. For instance, the button of the Nokia device is a mechanical button and requires some type of mechanism for releasing the button for the "off" state. The button is also located on a housing for the internal circuitry that is separate from the electronic device connector, the connector being a two-terminal device (that is, having "+" and "−" terminals). The Nokia device also requires some type of mechanism for determining when the device should be shut down.

As discussed above, most people do not bother to unplug their power devices when they remove the portable electronic device therefrom. The Nokia device certainly relieves a user from having to plug and un-plug the device, but it still requires a user to reach to wherever the device is received in a receptacle in order to turn on the device.

In order to be a true "zero-energy" device, the power input (i.e., AC input) to the power device must be cut. That is, the point in the power device circuitry where the circuit is broke is important: a switch or the like simply on a end-point terminal of the power device may cut the power being delivered to an electronic device connected thereto that is fully charged, but, such allows the internal circuitry to draw power so that the effect of such would be no different than simply removing the electronic device itself.

Towards this end, the Nokia device displays a uniform manner of thinking in the industry: a switch for connecting or disconnecting the AC power must be co-located with or closely proximate to the AC input such as the power prongs.

Accordingly, it is desirable and there is a need for an improved power device, charger or otherwise, for reducing phantom load when a portable electrical device is disconnected from the power device or otherwise not intended to be drawing power from the power device.

SUMMARY

In a first aspect, a power device for supplying power to a portable rechargeable electronic device is disclosed including a first portion for receiving electrical input power from a source, the input having an input voltage, a second portion for delivering electrical output power to the electronic device, the output power having an output voltage, a connector located on the second portion and removably connectable with the electronic device, and a switch assembly located remote from the first portion, the switch assembly having a member movable to and between first and second positions corresponding to respective "on" and "off" states, wherein the power device receives the input power in the "on" state, and the power device draws no input power in the "off" state.

In a form, the switch assembly member is a throw. In some forms, the throw may be a toggle or rocker throw.

In some forms, the switch assembly member is a sheath longitudinally movable to and between the first and second positions.

In some forms, the switch assembly member is manually movable to both the first and second positions by a user.

In some forms, the power device further includes a cable extending between the first portion and the second portion, and the first portion includes first and second prongs for electrical communication with a receptacle of a power outlet, circuitry electrically connected to the prongs and to the cable for changing the input power to the output power, and a housing from which the prongs and cable extend, the circuitry disposed within the housing, and the cable includes a first pair of wires for delivering power to the electronic device and a second pair of wires for communicating with the switch assembly. The second pair of wires may be connected such that the switch in the second position disconnects a prong from at least a portion of the circuitry to prevent power from being drawn by the power device. The switch assembly may be located proximate the second portion and connector thereof.

In another aspect, a power device for supplying power to a portable rechargeable electronic device is disclosed including a first portion for receiving electrical input power from a source, the input having an input voltage, a second portion for delivering electrical output power to the electronic device, the output power having an output voltage, circuitry for converting the input power voltage to the output power voltage and for determining an "off" state of the circuitry, a connector located on the second portion and removably connectable with the electronic device, and a switch assembly having powered terminals, the switch assembly responsive to movement of at least a movable portion thereof to electrically connect the terminals and to provide an output signal to activate the circuitry to the "on" state, wherein the circuitry automatically turns the circuitry to the "off" state, the circuitry drawing no power when in the "off" state.

In some forms, the switch assembly movable portion is biased to a first position and is movable to a second position by force applied by the user, cessation of the force permitting the movable portion to return to the first position, the switch assembly producing the output signal only when in the second position.

In some forms, the switch assembly movable portion is a pushbutton spring-biased to a first position and is movable to a second position by force applied by the user, the pushbutton in the second position electrically connecting the terminals to produce the output signal, the output signal being a momentary signal from a momentary connection of the terminals, and releasing the pushbutton permits return thereof to the first position.

In some forms, the switch assembly movable portion is an orientation-dependent switch.

In some forms, the switch assembly movable portion is a motion-sensing switch.

In some forms, the circuitry includes a timer programmed with a predetermined time period, the timer providing a timer signal to the circuitry at the conclusion of the time period, and the circuitry automatically changes to the "off" state in response to the timer signal.

In some forms, the circuitry includes a power sensing portion programmed with a predetermined threshold power level, wherein the circuitry automatically changes to the "off" state in response to the output power being at or below the threshold power level.

In some forms, the circuitry includes a latching relay that is closed in response to the switch assembly output signal, the latching relay being opened in response to the output power being at or below a threshold power level to change the circuitry to the "off" state.

In some forms, the circuitry includes a solid state switch element that opens in response to the output power being at or below a threshold power level to change the circuitry to the "off" state.

In some forms, the switch assembly is located remote from the first portion. The switch assembly may be located proximate the second portion.

In a further aspect, a power device for supplying power to a portable rechargeable electronic device is disclosed including a first portion for receiving electrical input power from a source, the input having an input voltage, a second portion for delivering electrical output power to the electronic device, the output power having an output voltage, circuitry for converting the input power voltage to the output power voltage and for determining an "off" state of the circuitry, a connector located on the second portion and removably connectable with the electronic device, and a switch assembly located remote from the first portion and having powered terminals, the switch assembly responsive to movement of at least a movable portion thereof to electrically connect the terminals and activate the circuitry to the "on" state, wherein the circuitry automatically turns the circuitry to the "off" state, the circuitry drawing no power when in the "off" state.

In some forms, circuitry includes a timer programmed with a predetermined time period, the timer providing a timer signal to the circuitry at the conclusion of the time period, and the circuitry automatically changes to the "off" state in response to the timer signal.

In some forms, the circuitry includes a power sensing portion programmed with a predetermined threshold power level, wherein the circuitry automatically changes to the "off" state in response to the output power being at or below the threshold power level.

In some forms, the switch assembly provides an output signal to activate the circuitry to the "on" state, and the circuitry includes a latching relay that is closed in response to the switch assembly output signal, the latching relay being opened in response to the output power being at or below a threshold power level to change the circuitry to the "off" state.

In some forms, the circuitry includes a solid state switch element that opens in response to the output power being at or below a threshold power level to change the circuitry to the "off" state.

In an additional aspect, a power device for supplying power to a portable rechargeable electronic device is disclosed including a first portion for receiving electrical input power from a source, the input having an input voltage, a second portion for delivering electrical output power to the electronic device, the output power having an output voltage, circuitry for converting the input power voltage to the output power voltage and for determining an "off" state of the circuitry, a connector located on the second portion and removably connectable with the electronic device, and a switch assembly having powered terminals to change the circuitry to the "on" state, wherein the circuitry automatically turns the circuitry to the "off" state, the circuitry drawing no power when in the "off" state.

In some forms, the switch assembly movable portion is biased to a first position and is movable to a second position by force applied by the user to change the circuitry to the "on" state. Cessation of the force may permit the movable portion to return to the first position.

In some forms, the circuitry includes a timer programmed with a predetermined time period, the timer providing a timer signal to the circuitry at the conclusion of the time period, and the circuitry automatically changes to the "off" state in response to the timer signal.

In some forms, the circuitry includes a power sensing portion programmed with a predetermined threshold power level, wherein the circuitry automatically changes to the "off" state in response to the output power being at or below the threshold power level.

In some forms, the circuitry includes a latching relay that is closed in response to the switch assembly changing the circuitry to the "on" state, the latching relay being opened in response to the output power being at or below a threshold power level to change the circuitry to the "off" state.

In some forms, the circuitry includes a solid state switch element that opens in response to the output power being at or below a threshold power level to change the circuitry to the "off" state.

In some forms, the switch assembly is located remote from the first portion.

In some forms, the switch assembly is located proximate the second portion.

BRIEF DESCRIPTION OF THE DRAWINGS

In the Figures, FIG. 1 is a partially fragmentary view of a first form of a power device of the present invention, the power device having a first end for connecting with a power source, a second end for connecting with an electrical device, and an in-line two-position switch;

FIG. 2 is a fragmentary view of the power device of FIG. 1 showing line designations for wires of a cable of the power device;

FIG. 3 is a simplified circuit diagram for the fragmentary portion of the power device of FIG. 2;

FIG. 4 is a representational view of a cross-section of a first form of the cable of the power device of FIG. 1;

FIG. 5 is a representational view of a cross-section of second form of the cable of the power device of FIG. 1;

FIG. 6 is a representational view of a form of the power device including an outer sheath positioned proximate a connector, the sheath being movable to and between first and second positions, the sheath being in a first position when the connector is not connected to an electrical device and in a second, retracted position relative to the connector when the connector is joined with an electronic device, the second position causing an electrical circuit to be closed;

FIG. 7 is a representational view of a form of the power device including a mechanically actuated switch, which may also include an integrated circuit coupled with the mechanically actuated switch;

DETAILED DESCRIPTION

Figure 8:
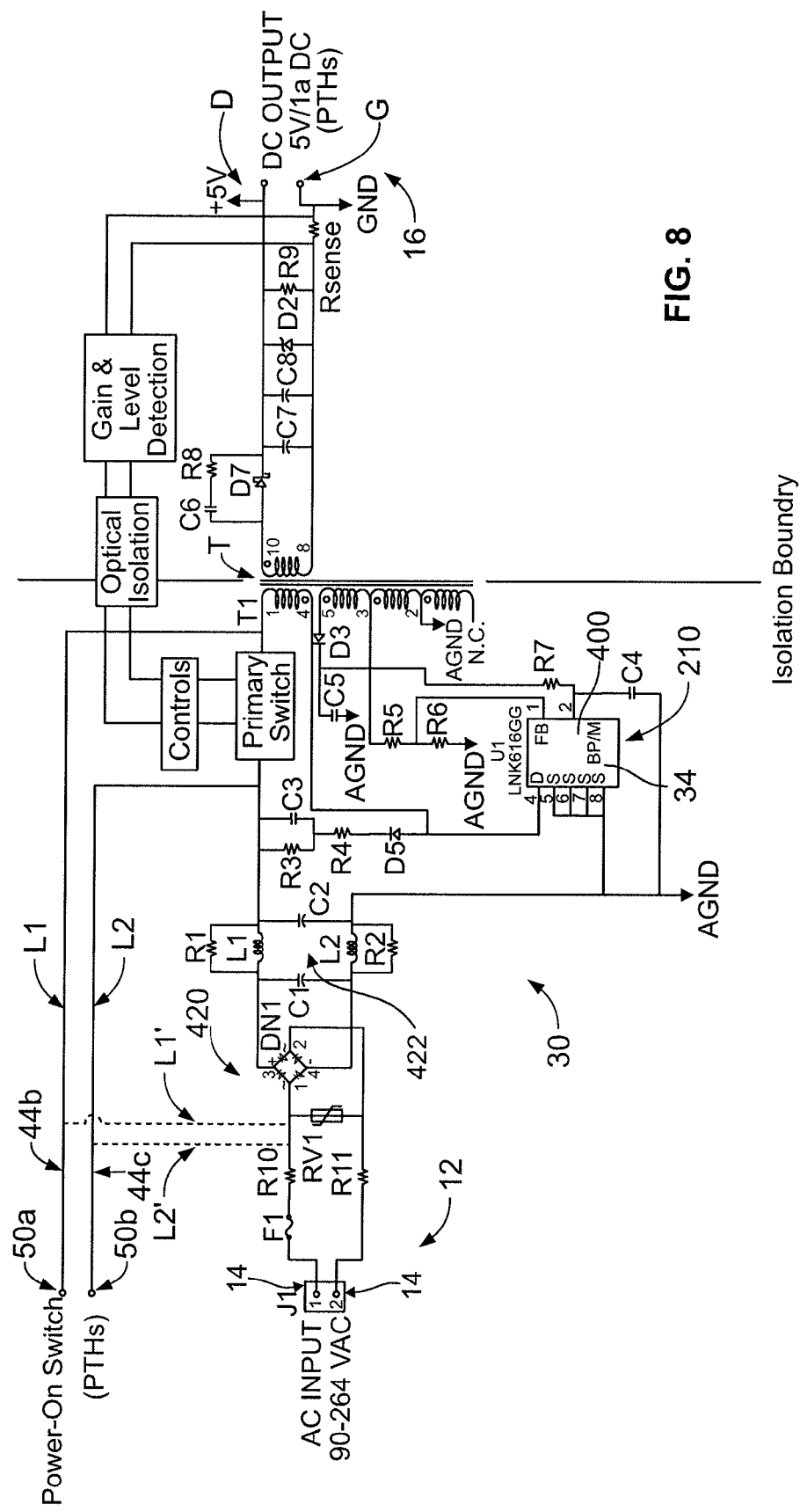
FIG. 8 is a circuit diagram illustrating aspects of different forms of a power device of the current invention.

Generally stated, the present invention includes a power device, such as a charger or adapter, for providing power to an electrical device that is designed to shut off or at least reduce power draw from a power source when the electrical device does not need power. In a more finite form of the invention, the power device is an AC-DC charger and converter for a portable rechargeable electronic device that is connectable with a connector on the power device. In the preferred forms, the power device has a housing co-located at a first end with prongs for connecting with an electrical sources such as an outlet, has a cable extending from the housing to a second end, and has the connector located at the second end for connecting with the portable electronic device. In a more preferred form, the second end includes switch components for switching the power device from an "off" state (when the electronic device is fully-charged or not connected to the connector) to an "on" state allowing power to be delivered to a connected electronic device. In one form, the switch components operate to cut power on the AC portion of the internal circuitry of the power device so that the power draw is zero or negligible (i.e., measured in microwatts). In another form, the switch components operate to initiate a power device "on" state while a timer circuit, a power sense circuit or other circuit means in the power device are used to switch the power device to an "off" state so that the power draw is zero or negligible.

Referring initially to FIGS. 1-3, a relatively basic form of a power device 10 is shown. The power device 10 has a first end 12 for connection with a receptacle of a power outlet (not shown), the power outlet providing electrical power to the power device first end 12 via prongs 14 that are inserted within the receptacle. The power device 10 also has a second end 16 for connecting with a receptacle 21 of an electronic device 20 (see FIG. 7). The electronic device 20 may be any type of device that may be connected or disconnected, for example a portable device such as a cellular telephone or music player or the like that is connected for charging and generally disconnected for use, though these electronic devices 20 are often left connected for longer durations of time than are necessary for fully charging the electronic device 20.

Towards this end, the power device 10 includes electronic circuitry 30, discussed below and shown in FIG. 8, for altering input power from the receptacle at the prongs 14 to output power delivered to the electronic device 20. The circuitry 30 is generally located within a housing 32 preferably positioned proximate to the first end 12. For instance, the power device 10 may receive 120 VAC at the prongs 14 and, after conversion and stepping, delivers 5 VDC from the ground G and current output D, discussed below.

The power device 10 includes a connector 40 providing the ground G and current output D. In some forms, the connector 40 is directly connected to the electronic device receptacle 21, though there may also be an intermediate connector 23 (see FIG. 7). The intermediate connector 23 includes a receptacle 23a for receiving the connector 40 and a secondary connector 23b for receipt into the electronic device receptacle 21. In a preferred form, a plurality of intermediate connectors 23 may be provided, and a user is able to select an intermediate connector 23 for a specific corresponding electronic device 20. In this manner, features of the present power device 10 are enabled and supported while still allowing the use of any type of connector 40 (and connection with the electronic device 20).

As can be seen in FIGS. 1 and 2, the power device 10 includes a cable 42 generally extending between and connected with the housing 32 and the connector 40. As also can be seen, a switch assembly 50 is provided in-line with the cable 42. In FIG. 1, a preferred form of the connector 40 is shown as a mini-USB connector having four wires 44a-44d, though other connectors 40 (standard or not) may be used, and, as discussed above, the connector 40 may be used with the intermediate connector 23 so that the secondary connector 23b is provided for use with the electronic device 20.

As is readily recognized, the switch assembly 50 includes a rocker or toggle throw 52 having two positions for connecting or disconnecting power to the connector 40. In a first position, the throw 52 is in an "on" state so that a circuit is closed across switch terminals 50a and 50b (see FIG. 3), and power is conducted to the electronic device 20 when connected to the connector 40, while the throw 52 is in an "off" state when in the second position with the circuit being open across terminals 50a and 50b and no power is conducted to the electronic device 20.

Turning to FIG. 3, it can be seen that cable 42 includes the wires 44a-44d for, respectively, direct current output D, first live L1, second live L2, and ground G, as are known for use with a mini-USB. The lives L1 and L2 are connected to the throw 52 such that they are connected when the throw 52 is in the "on" state, and such that they are disconnected when the throw 52 is in the "off" state. The output D and ground G pass through the switch assembly 50 for connection to their respective pins of the mini-USB connector 40. In comparison to FIG. 8 showing the entire circuit including the alternating current input at the prongs 14, the lives L1 and L2 have terminals 100 and 102, respectively, while the output D and ground G are labeled as such and are at the second end 16. When the connector 40 is used with the intermediate connector 23, the secondary connector 23b thereof need only be provided with electrical connection with the output D and ground G terminals.

FIG. 3 also shows the wiring of the wires 44a-44d, while FIGS. 4 and 5 illustrate how the wires 44a-44d in a single jacket 46 (FIG. 4) or in a pair of jackets 46 (FIG. 5) separated by a bridge 48 to provide additional isolation. Preferably, 26 American Wire Gauge (AWG) is used for the lives L1 and L2, while 22 AWG may be used for the ground G and output D wires. It is preferred that total isolation between the lives L1, L2 and the ground G/output D pairs is minimally 3 kV.

In a preferred form of the power device 10, the switch assembly 50 is located proximate to the connector 40. In this manner, a user may easily manually switch the throw 52 between the "on" and "off" states when the electronic device 20 is connected or removed. In a preferred form, the switch assembly 50 includes a rocker switch, minimum rated at 2.5 A, to which the lives L1 and L2 are connected and including the throw 52. The cable 42 is preferably in the order of 6 feet in length.

More importantly, by utilizing the four-wire form described for the cable 42, the switch assembly 50 opening or closing the switch terminals 50a, 50b on wires 44b and 44c (for the lives L1 and L2) are able to cut power anywhere in the power device 10. In greater detail and with reference to FIG. 8, the power device 10 receives an input power at the prongs 14. The portion of a charger/adapter that is most directly responsible for power draw or phantom load are a switcher IC chip 210 (see FIG. 8), a transformer T (see FIG. 8), and components downstream therefrom. As can be seen in FIGS. 3 and 8, the switch terminals 50a and 50b are generally remote from the other circuit components of the power device 10. However, the wires 44b and 44c are connected with the circuit diagram of FIG. 8 before the transformer T. Therefore, if the circuit is open across terminals 50a and 50b, the power in the power device 10 is cut, the transformer T is unable to draw power, and the phantom load for the power device 10 is virtually eliminated. In an alternate form shown also shown in FIG. 8, lives L1' and L2' are provided, substituting for lives L1 and L2 as shown, and are able to cut power in the power device 10 before the rectifying diode bridge 420 by being opened at the switch terminals 50a and 50b.

Turning to FIG. 6, a second form of the power device is shown as power device 100, also including a mini-USB connector 140. More specifically, a different form of switch assembly 50 is shown. For simplicity, the power device 100 is shown having a cable 102 and a second end 104, and it is understood that a first end and circuitry for the power conversion and step down would be incorporated into the power device 100 despite not being illustrated. In this form, the switch assembly 50 is shown as a sheath 110 provided on a portion of the cable 102. The sheath 110 is longitudinally movable to and between a first position, illustrated in dashed lines, and a second position, illustrated in solid lines, wherein the first and second positions respectively corresponds to the "on" and "off" states discussed above. The sheath 110 is slid rearwardly and away from an end 140a of the connector 140 when an electronic device 20 is connected thereto. In so doing, a contact 112 positioned on the sheath 110 is moved into electrical connection with first and second terminals T (also corresponding to terminals 50a and 50b in FIGS. 3 and 8) to close the circuit and allow the power device 100 to deliver power from the connector 140. Preferably, the sheath 110 is biased forwardly so that, when the electronic device 20 is disconnected, the sheath 110 automatically turns the power device to the "off" state.

In another form, FIG. 7 illustrates a power device 200 including a mechanical motion-sensing switch 202 located proximate a connector 240. In one form, the switch 202 may be a position-dependent switch, such as a mercury switch, so that the switch state ("on" or "off") is dependent on the orientation of the switch 202 and the connector 240. In another form, the switch 202 may be connected to an integrated circuit (IC) 210 (see, e.g., FIG. 8) so that, with a brief connection across terminals T, the IC 210 activates the switch 202 to the "on" state. Such brief connection-type switch 202 may be a mercury switch, may be a cantilever-contact switch, or another type of switch.

In some forms, which may or may not be incorporated into the power device 200 of FIG. 7, the IC 210 may control a switch 340 located therein For instance, the IC 210 may include a timer for shifting the switch 340 to the "off" state, or the IC 210 may control the switch 340 in the form of an electromechanical relay or a solid state equivalent such as a MOSFET switch, as will be appreciated by one skilled in the art. To return the switch 340 to the "on" state, a number of means may be employed, such as a mechanical switch depressed briefly by a user, a position-dependent switch, a quick or brief connection switch that communicates with the IC 210, as mere examples.

In another form using the IC 210 and switch 340, a load sensing device 400 may be incorporated within the IC 210, as also shown in FIG. 8. The load sensing device 400 measures the power or load (i.e., watts or amperage) being drawn from the power device 10. The load is markedly higher when the electronic device 20 is connected thereacross and drawing power than when the electronic device 20 is either removed or is powered off, or not charging it's battery. Accordingly, the IC 210 and load sensing device 400 recognize power draw or a lack thereof. The IC 210 can then open the switch 340 and/or possibly a switch external to the IC, to cease the current draw when it is recognized that no electronic device 20 is drawing therefrom. Preferably, such a form for the IC 210 includes a timer so that a slight pause in power or brief disconnect between the electronic device 20 and the connector at the ground G and output D does not cause the IC 210 to shut the power off by opening the switch 340. As an example, the load sensing device 400 senses the pulse width and recognizes how slow or fast the pulse is repeated to determine the load. As such, when the battery 20a of the electronic device 20 ceases to draw power, the power device 10 can be calibrated to switch to the "off" state.

It should be noted that the IC 210 and switch 340 and load sensing device 400 may be on-line or off-line and may be in a variety of configurations. As an example, the load sensing device 400 and IC 210 may be a pulse-width modulation (PWM) or other type of switch that carries its own IC, the PWM device shutting off a portion of the power device 10 while allowing a small portion (such as an incoming diode bridge 420 and input filter capacitors 422, see FIG. 8) to remain powered by a low current. Pressing a switch (discussed above) can be used to communicate with the small portion (ie., the incoming diode bridge 420 and filter capacitors 422) to re-actuate and power-up the power device 10. In such a case, the PWM itself is also shut off until the power device is re-actuated. Therefore, while the power device 10 is not completely off, it is in a ultra-low power consumption state and is able to power-up more quickly.

Figure 9:
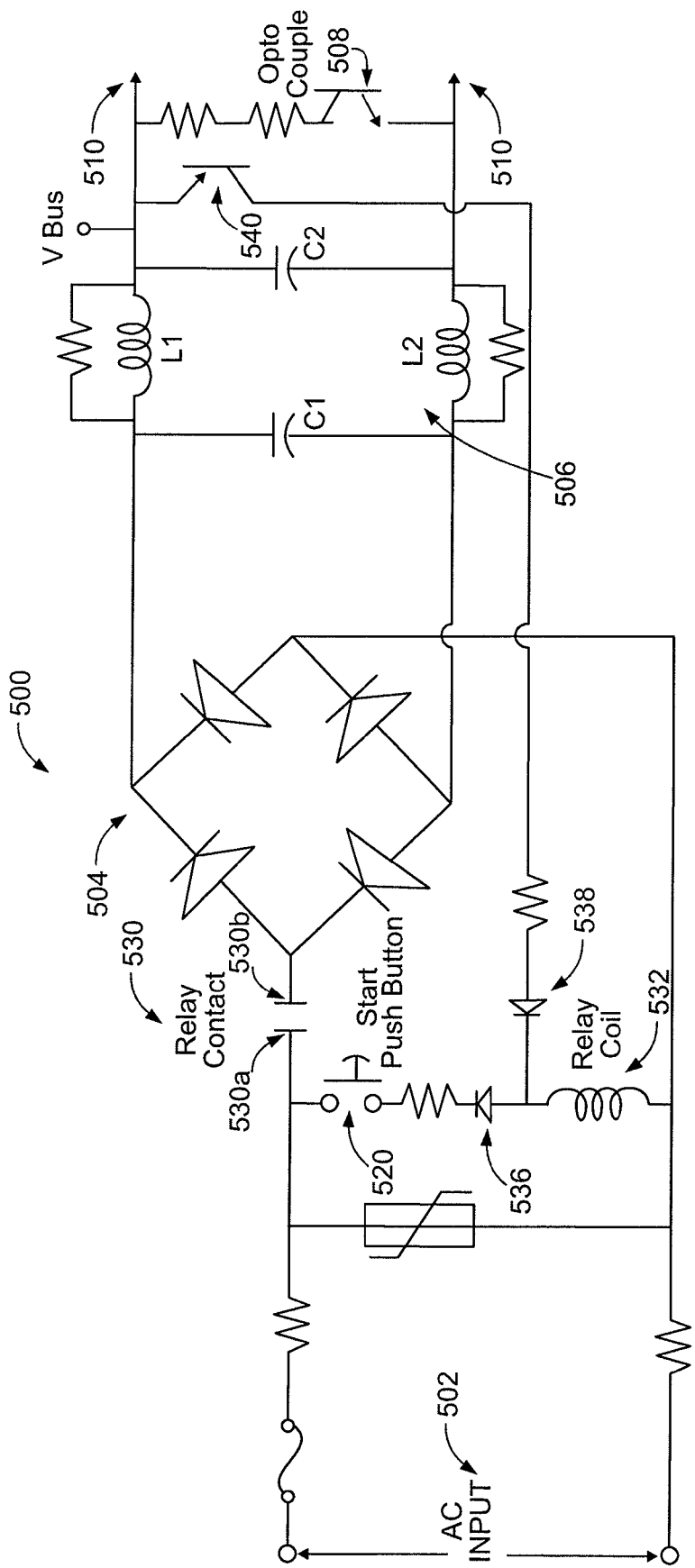
FIG. 9 is a partial circuit diagram showing an optional form of internal circuitry including a relay switch.

To be more specific with respect to pressing a switch, FIG. 9 illustrates portions of a circuit diagram showing such usage and arrangement. In detail, it can be seen that the circuit 500 includes an input 502 and a rectifying diode bridge 504 that leads to filter capacitors 506, which in turn lead to an optical isolation coupler 508 and nodes 510 for connection to IC 210 and transformer T (see FIG. 8). As can be appreciated, an entire power device circuit is not illustrated, though the other portions of such are shown and described elsewhere herein, or would be understood by one skilled in the art.

The circuit 500 includes a start switch 520, which may be any type of switch for making at least a brief electrical connection. Preferably, the start switch 520 is a push-button switch so that, upon releasing, the contacts of the start switch 520 are disconnected and the start switch 520 is open. Upon brief electrical connection by the start switch 520 (such as by being depressed), a relay electrical contact 530 is connected. To detail, closing the start switch 520 causes electrical connection thereacross and, resultingly, powers a relay coil 532. The relay coil 532 is akin to a solenoid so that it physically moves, this movement bring the plates 530a and 530b of the relay 530 together. The relay 530 is a latching-type relay so that it remains closed until otherwise instructed, powered or not. As can be seen, the relay coil 532 is connected to the start switch 520 by a closing diode 536 to effect this; the relay coil 532 is also connected to an opening diode 538 that is reversed in operation to the closing diode 536. As will be discussed, when the power device 10 recognizes a sufficiently low power draw, a transistor 540 is activated to cause power to flow through the opening diode 538 and, thus, reverse the physical movement of the relay coil 532, which in turn opens the relay plates 530a, 530b. In this manner, the power device 10 is returned to its "off" state.

With respect to the above-described sufficiently low power draw, it is noted that the power device 10 may be calibrated for the amount of load by an electronic device 20 or amount of load when no electronic device 20 is connected. The amount of power being drawn, as discussed above, can be measured by the size and frequency of the pulses. The voltage can be measured across a capacitor within a circuit that connects to a transformer output winding of the electronic device 20. In one form, when the power load is sufficiently small, the capacitor will drain faster than the recharging thereof, eventually resulting, in the transistor 540 being charged to open the relay plates 530a, 530b. In another form, the capacitor can be connected to a comparator (such as a simple IC) so that the comparator switches to a state that again charges the transistor 540.

In other related forms, intermittent monitoring for the presence of the electronic device 20 may be performed. In one form, for instance, the IC 210 and switch 340 may intermittently monitor the load via the load sensing device 400. For instance, the IC 210 may shut down most of the power device, yet power up the load sensing 400 periodically (i.e., every couple minutes) for a fraction of a second to determine if the electronic device 20 is present (which would be recognized by the load characteristics across the ground G and output D).

As described, various power devices are described having a variety of features that may be selected and/or combined within the scope of the present invention to provide a means for low-power consumption of phantom load, or intermittent power consumption, or no power consumption. As can be seen, some of these power devices are dependent in operation on the presence or absence of the electronic device, such as would be best suited for a portable, rechargeable device that is removed when charged, while others are independent of the presence or absence of the electronic device, such as would be useful for a computer which is commonly left plugged in and connected to a power device (i.e., power brick) when turned off.

Figure 10:
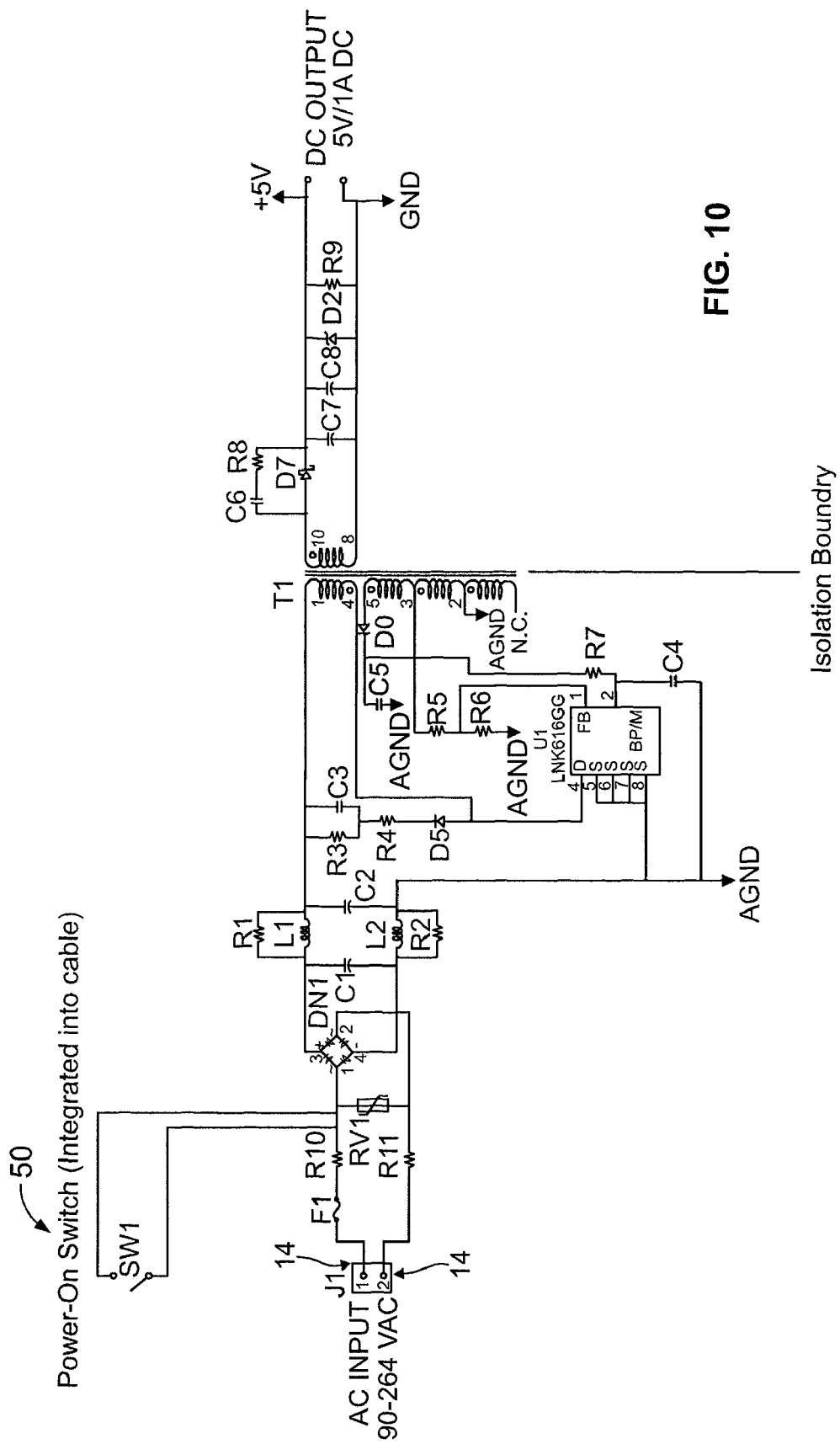
FIG. 10 is a circuit diagram of an exemplary form of the power device showing a switch provided to open the circuit at or proximate one of prongs to prevent power from being drawn by the power device.
Figure 11:
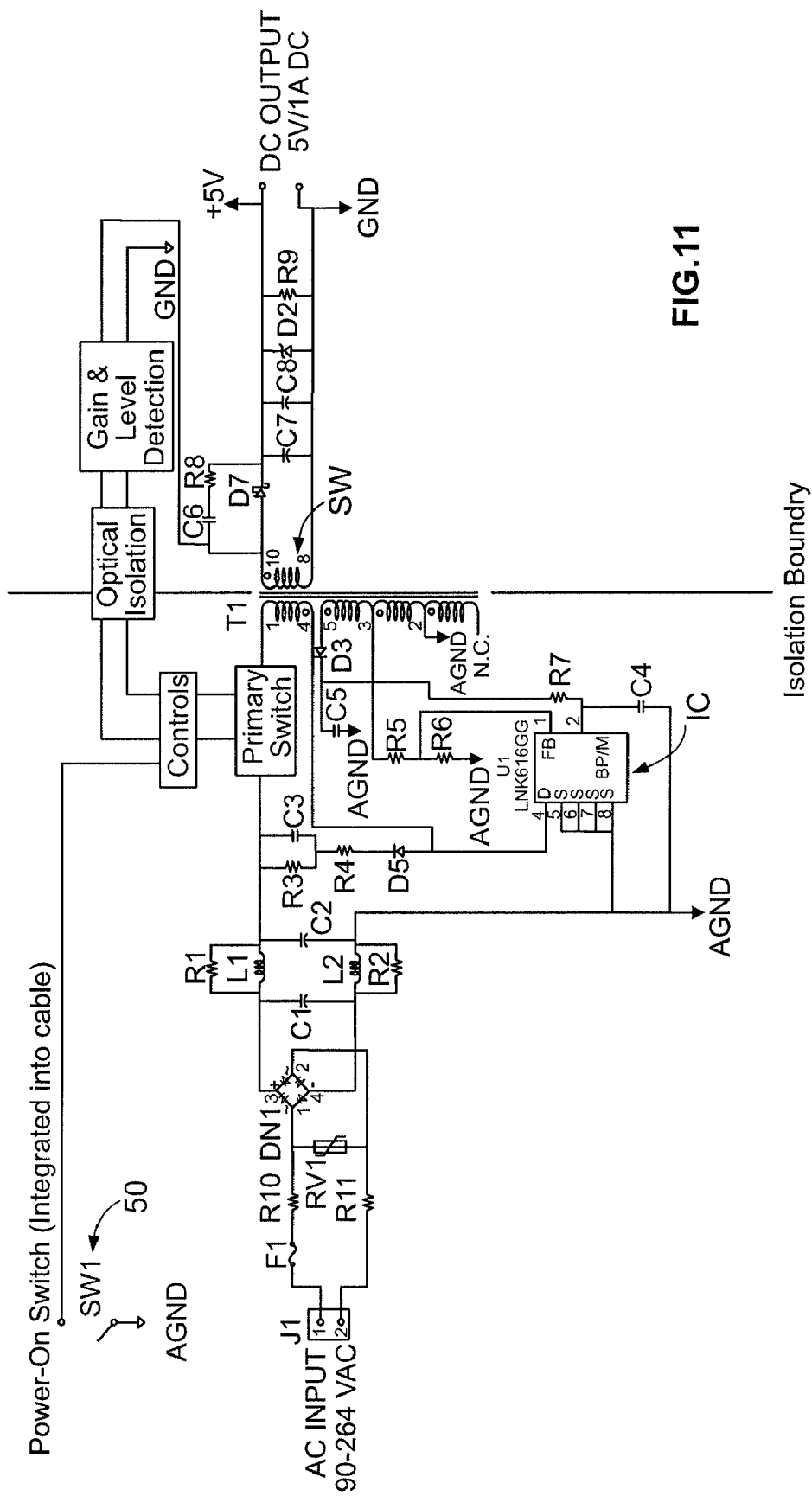
FIG. 11 is a circuit diagram of an exemplary form of the power device showing a power-on or activating switch, such as a solid state switch, a portion of the circuit monitoring the transformer secondary pulses to create a voltage proportional to the load current to drive an auto-shutoff switch.
Figure 12:
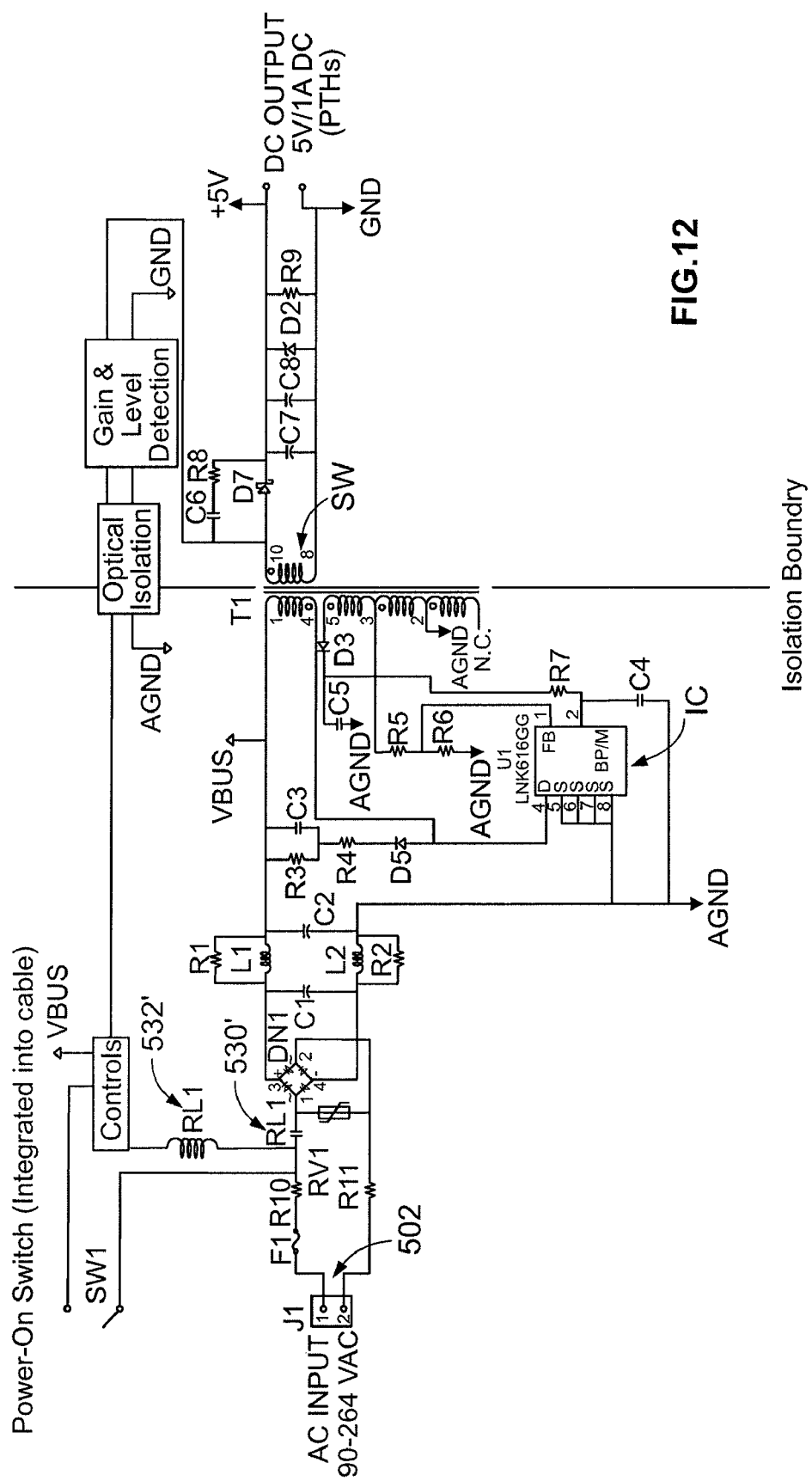
FIG. 12 is a circuit diagram of an exemplary form of the power device showing an electromechanical relay provided to open and close the circuit at or proximate one of prongs to prevent power from being drawn by the power device, the electromechanical relay being connected with a switch for activating and closing the relay and the circuit.
Figure 13:
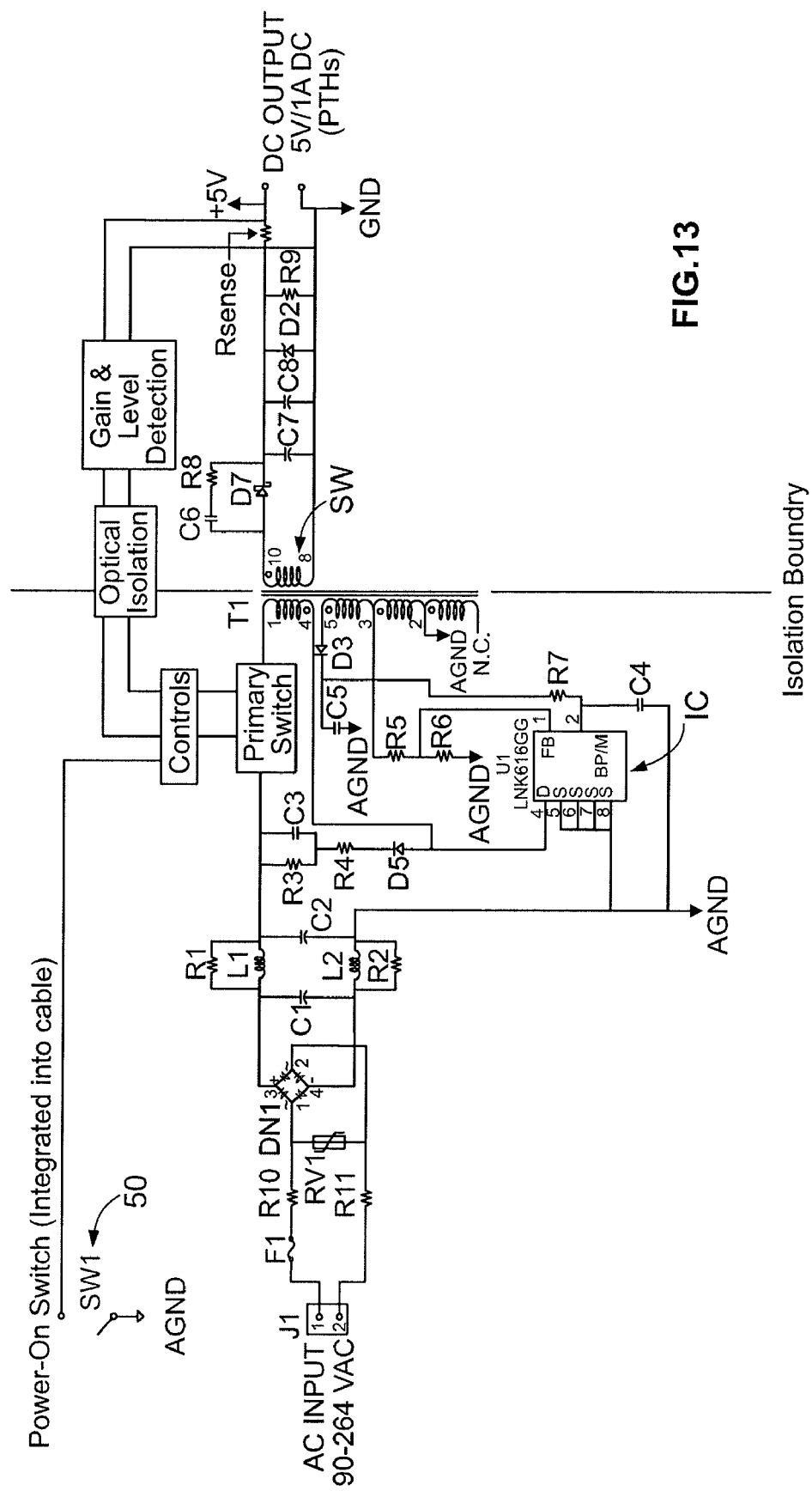
FIG. 13 is a circuit diagram of an exemplary form of the power device showing a switch for determining the state of the power device with a current sensing circuit.

It should be noted that a variety of the features discussed herein may be combined with other features discussed herein. Towards this end, FIG. 8, for instance, shows a number of features which are not necessary for practicing the invention in all its forms. As described above, FIG. 9 is directed towards a form of the power device utilizing a relay 530 driven to close the circuit, and FIG. 12 shows a similar form of a circuit for such power device utilizing a relay 530' driven by a relay coil 532', the relay 530' being located in the circuit at a position so that opening the relay 530' disconnects all power consumption for the power device. FIG. 10 shows a relatively simple circuit architecture in which a switch 50 connects at or proximate one of the prongs 14 for disconnecting the input power before the power-consuming components, resulting in a zero current draw. As noted in FIG. 10, the switch 50 may be integrated into the cable 42 so that the switch 50 is remote from the other circuitry, as has been discussed above. FIG. 11 shows a circuit architecture for the power device wherein the Gain and Level Detection operates to monitor pulses from a transformer secondary winding SW to drive a Primary Switch in the with a voltage proportional to the load current. The form of FIG. 11 utilizes a momentary connection at switch 50 to activate the power device, via a brief current resulting from the connection, and Controls operate the Primary Switch as an automatic shut-off feature when the power device is to be turned off, such as due to the electronic device being charged or disconnected. It should be noted that the Gain and Level Detection, the Control, and the Primary Switch may be included in an IC not shown or in the IC shown in the FIG. 11. FIG. 13 shows the switch 50 preferably being a solid state switch, and the power device circuit architecture is designed so that upon momentary connection (including connection and subsequent release) a small current through the switch 50 is recognized to power on or activate the device from an "off" state, and current at resistor $R_{sense}$ is recognized by Gain and Level Detection to control the Primary Switch, voltage below a threshold being used to determine and switch to an "off" state for the power device.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A power device for supplying power to a portable rechargeable electronic device, the power device comprising:
   a first portion for receiving electrical input power from a source, the input having an input voltage;
   a second portion for delivering electrical output power to the electronic device, the output power having a DC output voltage;
   a connector located on the second portion and removably connectable with the electronic device; and
   a switch assembly having a member movable to and between first and second positions corresponding to respective "on" and "off" states of the power device, wherein the power device receives the input power in the "on" state, and the power device draws no input power in the "off" state.

2. The power device of claim 1 wherein the switch assembly member is a throw.

3. The power device or claim 2 wherein the throw is a toggle or rocker throw.

4. The power device of claim 1 wherein the switch assembly member is a sheath longitudinally movable to and between the first and second positions.

5. The power device of claim 4, wherein the sheath is biased to the second position so that, when the electronic device is disconnected from the connector, the sheath automatically turns the power device to the "off" state.

6. The power device of claim 1 wherein switch assembly member is manually movable to at least one of the first and second positions by a user.

7. The power device of claim 1 further including a cable extending between the first portion and the second portion, wherein the first portion includes:
   first and second prongs for electrical communication with a receptacle of a power outlet;
   circuitry electrically connected to the prongs and to the cable for changing the input power to the output power; and
   a housing from which the prongs and cable extend, the circuitry disposed within the housing,
   wherein the cable includes a first pair of wires for delivering power to the electronic device and a second pair of wires for communicating with the switch assembly.

8. The power device of claim 7 wherein the second pair of wires is connected such that the switch in the second position disconnects a prong from at least a portion of the circuitry to prevent power from being drawn by the power device.

9. The power device of claim 7 wherein the switch assembly is located proximate the second portion and connector thereof.

10. The power device of claim 1 wherein the switch assembly is located on the second portion and longitudinally movable to and between the first and second positions, and wherein the switch at least partially overlaps the connector when in the second position.

11. A power device for supplying power to a portable rechargeable electronic device, the power device comprising:
    a first portion for receiving electrical input power from a source, the input having an input voltage;
    a second portion for delivering electrical output power to the electronic device, the output power having an output voltage;
    circuitry for converting the input power voltage to the output power voltage and for determining an "off" state of the circuitry;
    a connector located on the second portion and removably connectable with the electronic device; and
    a switch assembly having powered terminals, the switch assembly responsive to movement or at least a movable portion thereof to electrically connect the terminals and to provide an output signal to activate the circuitry to the "on" state,
    wherein the circuitry automatically turns the circuitry to the "off" state, the circuitry drawing no power when in the "off" state.

12. The power device of claim 11 wherein the switch assembly movable portion is biased to a first position and is movable to a second position by force applied by the user, cessation of the force permitting the movable portion to return to the first position, the switch assembly producing the output signal only when in the second position.

13. The power device of claim 11 wherein the switch assembly movable portion is a pushbutton spring-biased to a first position and is movable to a second position by force applied by the user, the pushbutton in the second position electrically connecting the terminals to produce the output signal, the output signal being a momentary signal from a momentary connection of the terminals, and releasing the pushbutton permits return thereof to the first position.

14. The power device of claim 11 wherein the switch assembly movable portion is an orientation-dependent switch.

15. The power device of claim 11 wherein the switch assembly movable portion is a motion-sensing switch.

16. The power device of claim 11 wherein the circuitry includes a timer programmed with a predetermined time period, the timer providing a timer signal to the circuitry at the conclusion of the time period, and the circuitry automatically changes to the "off" state in response to the timer signal.

17. The power device of claim 11 wherein the circuitry includes a power sensing portion programmed with a predetermined threshold power level, wherein the circuitry automatically changes to the "off" state in response to the output power being at or below the threshold power level.

18. The power device of claim 11 wherein the circuitry includes a latching relay that is closed in response to the switch assembly output signal, the latching relay being opened in response to the output power being at or below a threshold power level to change the circuitry to the "off" state.

19. The power device of claim 11 wherein the circuitry includes a solid state switch element that opens in response to the output power being at or below a threshold power level to change the circuitry to the "off" state.

20. The power device of claim 11 wherein the switch assembly is located remote from the first portion.

21. The power device of claim 20 wherein the switch assembly is located proximate the second portion.

22. The power device of claim 11 wherein the switch assembly comprises a sheath longitudinally movable to and between first and second positions, wherein the first position corresponds to the "on" state.

23. The power device of claim 22, wherein the sheath is biased to the second position so that, when the electronic device is disconnected from the connector, the sheath automatically turns the power device to the "off" state.

24. A power device for supplying power to an electronic device, the power device comprising:
a first portion for receiving electrical input power from a source, the input having an input voltage;
a second portion for delivering electrical output power to the electronic device, the output power having an output voltage;
power circuitry for converting the input power voltage to the output power voltage and for determining an "off" state of the power device;
switching circuitry operable to electrically activate the power circuitry to the "on" state; and
a load sensing portion operable to sense one or more pulses and determine the power or load being drawn from the power device by the electronic device based thereon.

25. The power device of claim 24 wherein the switching circuitry includes a timer programmed with a predetermined time period, the timer providing a timer signal to the circuitry at the conclusion of the time period, and the switching circuitry automatically changes the power circuitry to the "off" state in response to the timer signal.

26. The power device of claim 24 wherein the load sensing portion is programmed with a predetermined threshold level, wherein the switching circuitry automatically changes the power circuitry to the "off" state in response to the power or load being drawn from the power device by the electronic device being at or below the threshold level.

27. The power device of claim 24 wherein the switching circuitry provides an output signal to activate the power circuitry to the "on" state, and the power circuitry includes a latching relay that is closed in response to the switching circuitry output signal, the latching relay being opened in response to the power or load being drawn from the power device by the electronic device being at or below a threshold power level to change the circuitry to the "off" state.

28. The power device of claim 24 wherein the power circuitry includes a solid state switch element that opens in response to the power or load being drawn from the power device by the electronic device being at or below a threshold power level to change the circuitry to the "off" state.

29. The power device of claim 24, wherein the load sensing portion determines the power or load being drawn from the power device by the electronic device by measuring the size of the pulses.

30. The power device of claim 24, wherein the load sensing portion determines the power or load being drawn from the power device by the electronic device by measuring the frequency of the pulses.

31. The power device of claim 24, wherein the load sensing portion measures the pulses electrically on a winding of a transformer of the power device.

32. The power device of claim 31, wherein the load sensing portion measures the pulses across a capacitor within a circuit that connects to the winding of the transformer of the power device.

33. The power device of claim 24, wherein the load sensing portion measures the pulses from transformer control circuitry which controls a power state of a transformer of the power device.

34. The power device of claim 33, wherein the transformer control circuitry comprises switched mode power supply circuitry.

35. The power device of claim 33, wherein the transformer control circuitry comprises pulse-width modulation (PWM) circuitry.

36. The power device of claim 24 further comprising transformer control circuitry for controlling a power state of a transformer of the power device, wherein the transformer control circuitry and the load sensing portion are incorporated onto a single integrated circuit.

37. The power device of claim 24, wherein the circuitry automatically turns the circuitry to the "off" state, the circuitry drawing no power when in the "off" state.

38. The power device of claim 24 wherein the switch assembly comprises a sheath longitudinally movable to and between first and second positions, wherein the first position corresponds to the "on" state.

39. The power device of claim 38, wherein the sheath is biased to the second position so that, when the electronic device is disconnected from the connector, the sheath automatically turns the power device to the "off" state.

40. A power device for supplying power to a portable rechargeable electronic device, the power device comprising:
a first portion for receiving electrical input power from a source, the input having an input voltage;
a second portion for delivering electrical output power to the electronic device, the output power having an output voltage;
power circuitry for converting the input power voltage to the output power voltage and for determining an "off" state of the circuitry, the power circuitry including a switching element;
a connector located on the second portion and removably connectable with the electronic device; and
switching circuitry, separate from the switching element, having powered terminals to change the power circuitry to the "on" state by causing the switching element to close, wherein the power circuitry or switching circuitry automatically turns the power circuitry to the "off" state by causing the switching element to open, the power circuitry drawing substantially no power when in the "off" state.

41. The power device of claim 40 wherein the switching circuitry includes a movable portion that is biased to a first position and is movable to a second position by force applied by the user to change the circuitry to the "on" state.

42. The power device of claim 41 wherein cessation of the force permits the movable portion to return to the first position.

43. The power device of claim 40 further comprising a timer programmed with a predetermined time period, the timer providing a timer signal to the power circuitry at the conclusion of the time period, and the power circuitry automatically changes to the "off" state in response to the timer signal.

44. The power device of claim 40 further comprising a power sensing portion programmed with a predetermined threshold power level, wherein the power circuitry automatically changes to the "off" state in response to the output power being at or below the threshold power level.

45. The power device of claim 40 wherein the switching element comprises a latching relay that is closed in response to the switch assembly changing the power circuitry to the "on" state, the latching relay being opened in response to the output power being at or below a threshold power level to change the circuitry to the "off" state.

46. The power device of claim 40 wherein the switching element comprises a solid state switch element that opens in response to the output power being at or below a threshold power level to change the power circuitry to the "off" state.

47. The power device of claim 40 wherein at least a portion of the switching circuitry is located remote from the first portion.

48. The power device of claim 40 wherein at least a portion of the switching circuitry is located proximate the second portion.

49. The power device of claim 40 wherein the switching circuitry comprises a sheath longitudinally movable to and between first and second positions, wherein the first position corresponds to the "on" state.

50. The power device of claim 49, wherein the sheath is biased to the second position so that, when the electronic device is disconnected from the connector, the sheath automatically turns the power device to the "off" state.

51. A power device for supplying power to an electronic device, the power device comprising:
    a first portion for receiving electrical input power from a source, the input having an input voltage;
    a second portion for delivering electrical output power to the electronic device, the output power having a DC output voltage;
    a connector located on the second portion and removably connectable with the electronic device;
    a switch located on the second portion and longitudinally movable to and between first and second positions, the first position corresponding to an "on" state of the power device, wherein the power device receives the input power in the "on" state, and wherein the switch at least partially overlaps the connector when in the second position; and
    wherein the power device draws substantially no input power in the "off" state.

52. The power device of claim 51, wherein the second position corresponds to the "off" state of the power device.

53. The power device of claim 52, wherein the switch is biased to the second position so that, when the electronic device is disconnected from the connector, the switch automatically turns the power device to the "off" state.

54. The power device of claim 51, wherein the switch is biased to the second position and is movable to the first position by an external force, wherein the switch returns to the second position upon cessation of the force.

55. The power device of claim 51, wherein the sheath is biased to the second position and moves to the first position when the connector is connected to the electronic device.

56. A power device for supplying power to a portable rechargeable electronic device, the power device comprising:
    a first portion for receiving electrical input power having an input voltage from the power outlet, the first portion including:
        prongs for electrical communication with a receptacle of a power outlet;
        converter circuitry for converting the input voltage into DC output voltage; and
        a housing from which the prongs extend, the converter circuitry disposed within the housing;
    a second portion for delivering electrical output power to the electronic device, the output power having the DC output voltage, and the second portion including a connector located on the second portion and removably connectable with the electronic device;
    a switch assembly having a member movable to and between first and second positions, corresponding to respective an "on" and "off" states of the power device, wherein the power device receives the input power in the "on" state, and the power device draws no input power in the "off" state; and
    a cable extending from the housing and between the first and second portions, the cable including a first pair of wires for delivering power to the electronic device and a second pair of wires for communicating with the switch assembly.

57. The power device of claim 56 wherein the second pair of wires is connected such that the switch in the second position disconnects one or more of the prongs from at least a portion of the converter circuitry to prevent power from being drawn by the power device.

58. The power device of claim 56 wherein the switch assembly is located proximate the second portion and connector thereof.

* * * * *